United States Patent [19]

Tutzer

[11] Patent Number: 4,627,513
[45] Date of Patent: Dec. 9, 1986

[54] INTERMEDIATE DIFFERENTIAL FOR A VEHICLE INCLUDING A SPUR GEAR/PLANETARY GEAR ARRANGEMENT

[75] Inventor: Peter Tutzer, Kornwestheim, Fed. Rep. of Germany

[73] Assignee: Dr. Ing h.c.F. Porsche AG, Stuttgart, Fed. Rep. of Germany

[21] Appl. No.: 611,855

[22] Filed: May 18, 1984

[30] Foreign Application Priority Data

May 19, 1983 [DE] Fed. Rep. of Germany ....... 3318251

[51] Int. Cl.⁴ .......................................... B60K 17/34
[52] U.S. Cl. .................................. 180/249; 74/694; 74/695; 74/705; 74/710.5; 180/233
[58] Field of Search ............... 180/233, 248, 249, 250; 74/665 GB, 665 GC, 705, 694, 695, 710, 710.5, 701

[56] References Cited

U.S. PATENT DOCUMENTS

| | | | |
|---|---|---|---|
| 1,309,978 | 7/1919 | Baker | 74/695 |
| 2,911,854 | 11/1959 | Fabian | 74/695 |
| 3,956,945 | 5/1976 | Eggleton et al. | 74/710.5 |
| 4,074,591 | 2/1978 | Dick | 74/710.5 X |
| 4,441,575 | 4/1984 | Suzuki | 180/248 |
| 4,449,604 | 5/1984 | Suzuki | 180/248 X |
| 4,523,495 | 6/1985 | Sala | 74/695 X |

FOREIGN PATENT DOCUMENTS

| | | | |
|---|---|---|---|
| 43806 | 1/1982 | European Pat. Off. | 180/249 |
| 91406 | 10/1983 | European Pat. Off. | 74/695 |
| 59020 | 5/1980 | Japan | 180/248 |
| 2115506 | 9/1983 | United Kingdom | 74/710.5 |

Primary Examiner—John J. Love
Assistant Examiner—Mitchell J. Hill
Attorney, Agent, or Firm—Barnes & Thornburg

[57] ABSTRACT

A drive for vehicles, especially a four-wheel drive for motor vehicles, with an engine installed transversely to the vehicle longitudinal axis whose output shaft is arranged axially parallelly to the input and output shafts of a change-speed transmission. An auxiliary power-divider gear having an intermediate differential gear is connected with the transmission output shaft; the transmission axis of the power-divider gear coincides with a vehicle axis, whereby the intermediate differential gear and the axle differential gear are adapted to be locked up by a clutch. The power-divider gear is constructed as spur gear-planetary gear transmission with an externally toothed planet gear carrier. The latter is operatively connected with a spur gear arranged on an axially parallelly arranged output shaft of the transmission. For the purpose of a power-divided axle drive, the planet gears of the transmission are in driving connection with a ring gear and a sun gear. The axle drive to a first vehicle axle takes place by way of the ring gear, and the further axle drive to a second vehicle axle takes place by way of the sun gear.

21 Claims, 3 Drawing Figures 4,627,513

INTERMEDIATE DIFFERENTIAL FOR A VEHICLE INCLUDING A SPUR GEAR/PLANETARY GEAR ARRANGEMENT

BACKGROUND OF THE INVENTION

The present invention relates to a drive for vehicles, especially to a four-wheel drive for motor vehicles with an engine that is installed in particular transversely to the vehicle longitudinal axis and whose output shaft is disposed essentially axially parallelly to an input and output shaft of a change-speed transmission, and in which a power-divider gear box with intermediate differential is connected with the transmission output shaft, whose transmission axis coincides with a vehicle axle.

A four-wheel drive for motor vehicles with an engine installed transversely to the vehicle longitudinal axis is disclosed in the European patent application 43 806, which includes a power-divider gear box with intermediate differential gear. In this power-divider gear, the output power flows from the output shaft of the change-speed transmission by way of a ring gear into the planetary gears, from which takes place the power-branching for the drive of the front and rear axles. With such a construction of a power-divider or transfer gear, only limited ratios of the drive torques of the front axle to the rear axle are possible by reason of the power inflow into the ring gear as well as the derivation of the output by way of the differential, on the one hand, and by way of the planetary gear carrier to the pinion, on the other. This construction is designed in particular for the purpose that a larger driving torque is to prevail at the rear axle than at the front axle with a front engine installed transversely to the driving direction.

It is the object of the present invention to provide a drive, especially a four-wheel drive for a motor vehicle, which involves a small space requirement and permits a large variation possibility of the output distribution to the two vehicle axles. Furthermore, the position of the drive for the second axle is to be variable, depending on the type of construction of the motor vehicle, without impairing the output distribution.

SUMMARY OF THE INVENTION

The underlying problems are solved according to the present invention in that the power-divider transmission is constructed as a spur gear-planetary gear transmission with an externally toothed planet carrier which is operatively connected with a spur gear arranged on an axially parallelly arranged output shaft of the transmission, and planetary gears of the transmission are in meshing engagement with a ring gear and with a sun gear for the purpose of a power-divided axle drive, whereby the axle drive to a first vehicle axle takes place by way of the ring gear and the further axle drive to a second vehicle axle by way of the sun gear.

The advantages principally achieved with the present invention reside in that a wide variation possibility of the output distribution to the axles is achieved by the possibility of the change in the stationary transmission ratio as also of the selection of the driven member of the spur gear-planetary gear transmission. Thus, with a motor vehicle having a rear engine, a moment distribution, for example, of 70% to the rear axle and 30% to the front axle is attainable by the arrangement and construction of the power-divider transmission in accordance with the present invention. Furthermore, the position of the drive shaft for the second vehicle axle may be matched to a certain extent to the space conditions of the vehicle determined by the type of construction in that the power-divider transmission with intermediate differential gear is installed offset.

These and other objects, features and advantages of the present invention will become more apparent from the following description when taken in connection with the accompanying drawing which shows, for purposes of illustration only, several embodiments in accordance with the present invention, and wherein:

DESCRIPTION OF THE ILLUSTRATIVE EMBODIMENTS

Figure 1:
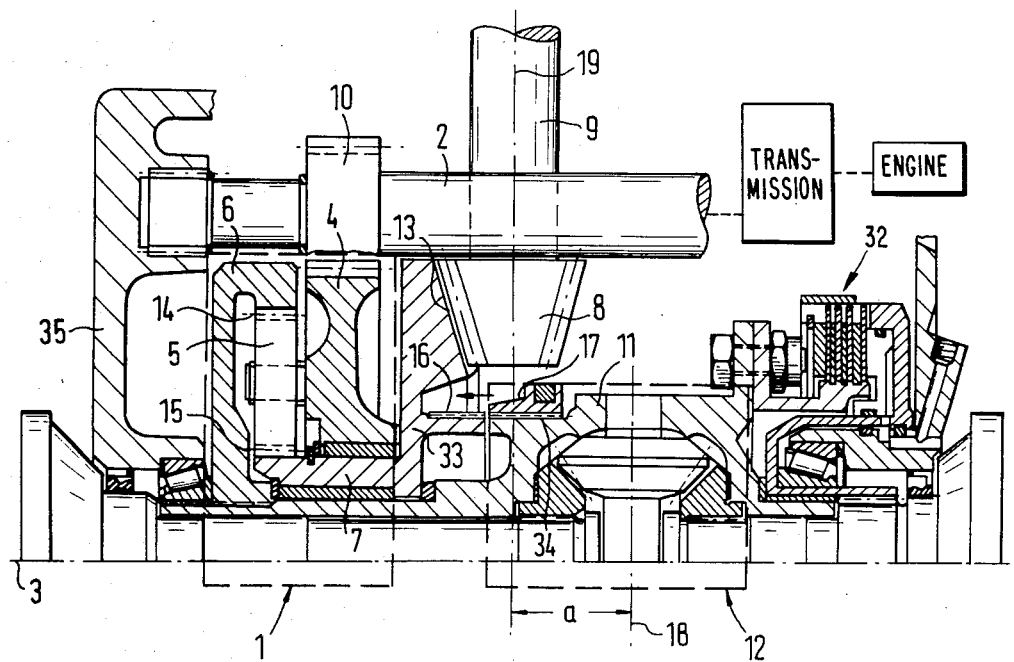
FIG. 1 is a cross-sectional view through an auxiliary power-dividing gear with intermediate differential power transfer mechanism and axle differential at a front or rear vehicle axle in accordance with the present invention.

Referring now to the drawing wherein like reference numerals are used throughout the various views to designate like parts, the drive for a motor vehicle includes a change-speed transmission disposed transversely to the vehicle's longitudinal axis and an engine also arranged transversely, whose output shaft is arranged essentially axially parallelly to the input and output shafts of the change-speed transmission. The engine can be installed in the front, rear or center of the vehicle and may have a transverse position or longitudinal position. In addition to an axle differential gear at each vehicle axle, an auxiliary power-divider transmission gearing generally designated by reference numeral 1 with intermediate differential power transfer mechanism is provided. The auxiliary power-divider 1 is drivingly connected with a spur gear 10 on an output shaft 2 of the change-speed transmission. Details of the change-speed transmission, of the engine as well as of the axle differential gear are not shown since they are conventional and of no significance to the present invention.

The auxiliary power divider transmission gearing 1 is constructed as spur gear-planetary gear transmission whose axis coincides with the wheel axis 3. According to FIGS. 1 and 2, the auxiliary power divider transmission gearing 1 is enclosed within housing 35 and includes an externally toothed planetary gear carrier 4 with planet gears 5 as well as a ring gear 6 and a sun gear 7. The drive of a further vehicle axle takes place by way of a pinion 8, which is connected with a drive shaft 9. This may be a front or rear axle corresponding to the arrangement of the auxiliary power-divider transmission gearing.

Figure 2:
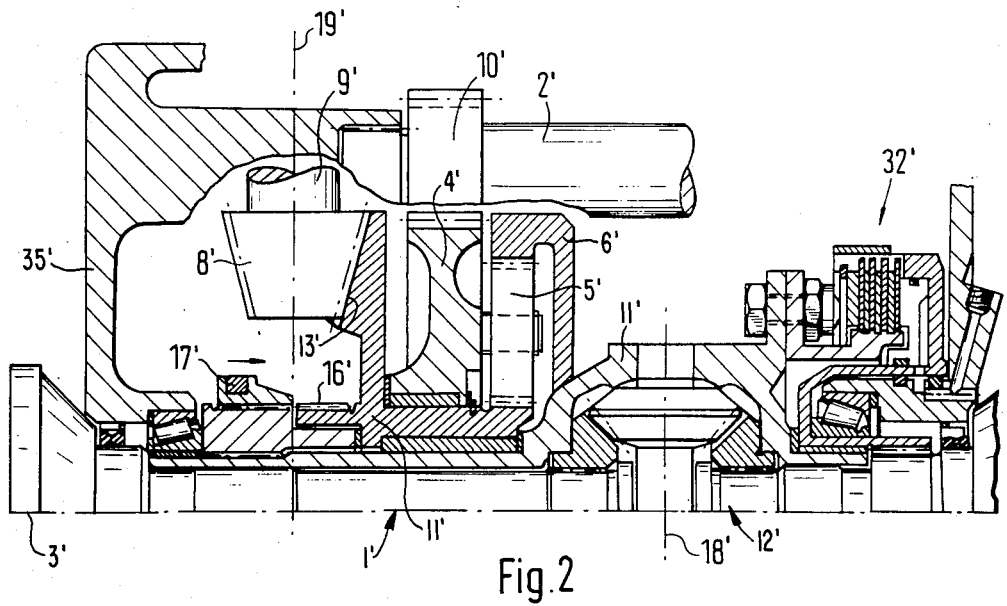
FIG. 2 is a cross-sectional view through a modified embodiment of the auxiliary power-divider gear in accordance with the present invention, similar to FIG. 1.

In the arrangement according to FIGS. 1 and 2, the power flows from the output shaft 2 of the change-speed transmission by way of the spur gear 10 into the planetary gear carrier 4 and from there into the planet gears 5. A power-division takes place at the planet gears 5 in that both the ring gear 6 as also the sun gear 7 are driven. The differential cage 11 of the axle differential generally designated by reference numeral 12 of a vehicle axle which coincides with the axis of the planetary gear transmission, is rigidly connected with the ring gear 6. This vehicle axle is therefore acted upon with the power output that is coordinated to the ring gear 6. The sun gear 7 drives by way of a bevel gear 13 and the pinion 8 the other vehicle axle which therefore receives the power output that is coordinated to the sun gear 7.

The ring gear 6 is provided with internal teeth 14 which are disposed opposite the external teeth 15 of the sun gear 7 whereby the sun gear 7 is rotatably supported on the cage 11 of the axle differential gear 12. The planetary carrier 4 which is rotatably arranged on the sun gear 7, is supported in an axial direction at an extension 33 of the sun gear 7. A support ring is provided in the other axial direction.

The sun gear 7 according to FIGS. 1 and 2 includes a radial extension, on which are provided the pinion gear 8 as well as the teeth 16 for a lock-up clutch 17.

The intermediate power transmission mechanism differential is adapted to be locked up by way of a clutch 17 in that the sun gear 7 is rigidly connected by way of its teeth 16 with the differential cage 11. In the instant case, this takes place by a displaceable shifting sleeve. For locking up the axle differential 12, a lamellae lock-up clutch generally designated by reference numeral 32 is provided which is actuatable by oil pressure.

In the further embodiment according to FIG. 2, an auxiliary power divider transmission gearing 1' with intermediate differential power transmission mechanism corresponding to FIG. 1 is provided. Differing from the construction according to FIG. 1 is the fact that the shaft 9' is variable in its position to the axle differential 12' by a relocation of the planetary gear set. The elements of the power divider transmission gearing of FIG. 2 corresponding to that of FIG. 1 are identified by a prime after the number. Thus, depending on the type of construction of the vehicle, the distance "a" (FIG. 1) between the axis 18 of the axle differential 12 and of the axis 19 of the shaft 9 can be increased or decreased.

Figure 3:
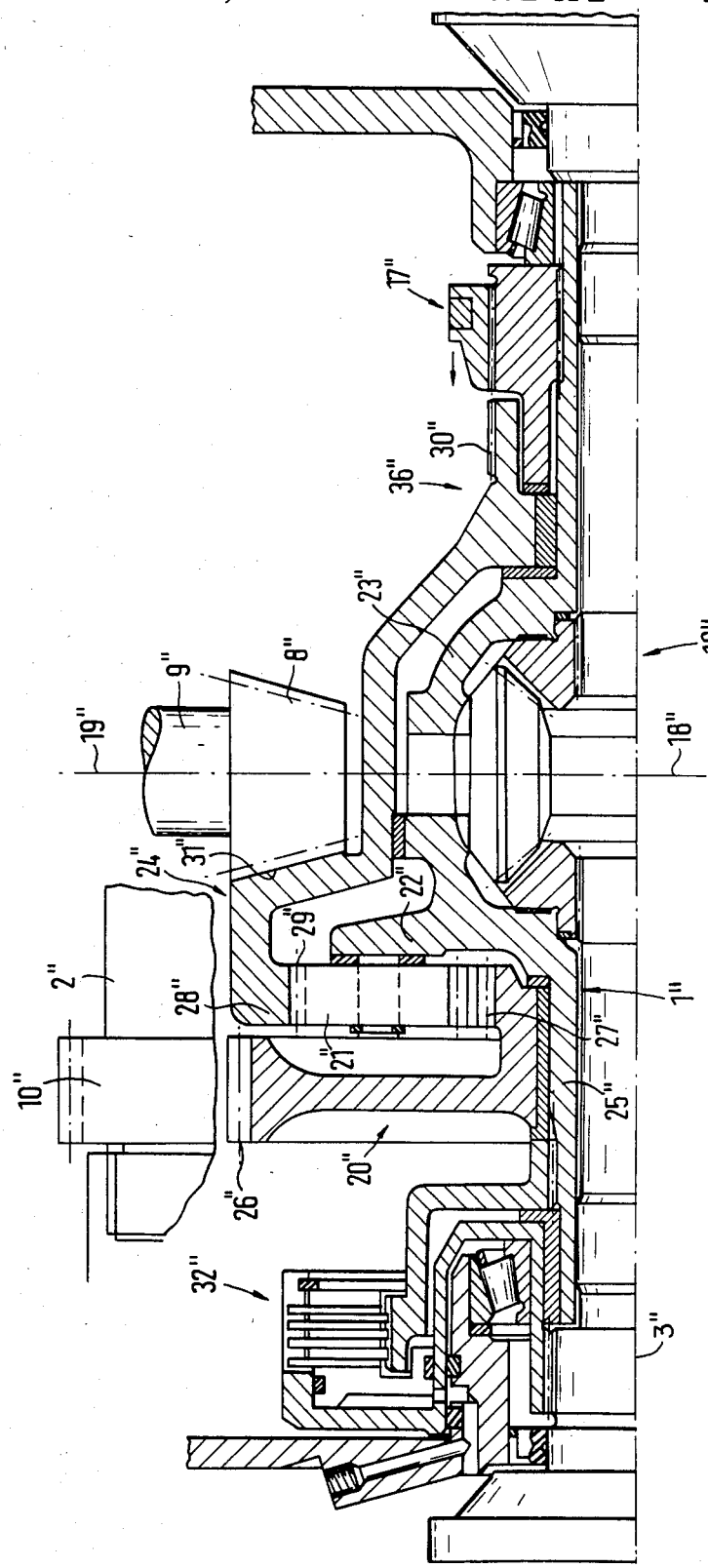
FIG. 3 is a cross-sectional view through a still further modified embodiment of an auxiliary power-divider gear with intermediate differential power transfer mechanism and axle differential in accordance with the present invention.

According to a further modification in accordance with FIG. 3, wherein corresponding elements to FIGS. 1 and 2 are identified by a double prime after the number, the sun gear 20" of the planetary gear transmission 1" is driven by way of the spur gear 10" on the shaft 2". The output power flows from the output shaft 2" of the change-speed transmission by way of the spur gear 10" into the sun gear 20" and from there into the planet gears 21", where a power division takes place. The vehicle axle which coincides with the planetary gear axis, receives the output power which is coordinated to the planetary gear carrier 22". The planetary gear carrier 22" forms a unitary structural element with the differential cage 23". The further vehicle axle receives the output power of the ring gear 24". The planet gears 21" in this construction are formed of planetary gear pairs.

The sun gear 20" is rotatably supported on a neck portion 25" of the differential cage 23". The sun gear 20" includes external teeth 26" which are in meshing engagement with the spur gear 10", and further external teeth 27" which are in meshing engagement with the planet gears 21".

The ring gear 24" is supported on the differential cage 23" whereby a flank of the ring gear 24" includes a spur bevel gear 31" and a drawn-in edge 28" includes internal teeth 29". The intermediate differential gear is adapted to be locked up by way of a clutch 17" adapted to be engaged with the teeth 30" at the ring gear 24". A lamellae clutch 32" is provided for the lock-up of the axle differential gear 12".

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A spur gear-planetary gearing means arrangement for use as a power transfer differential mechanism for an engine-driven four-wheel drive vehicle having a first and second axle and a transmission means for transferring power from the engine to said first and second axles, and wherein an output shaft of the engine is disposed transversely to the longitudinal axis of the vehicle and substantially parallel to an output shaft of the transmission means, said first and second axles being driven from the transmission means through a power-divider transfer differential gearing means comprising:

a planetary gear carrier (4) having outside toothing driven by a spur gear (10) driven by said output shaft of the transmission means, a planet gear (5) carried by said planetary gear carrier (4), ring gear (6), and a sun gear (7), said planet gear (5) being arranged for asymmetrical load distribution for driving said ring gear (6) and said sun gear (7), said ring gear (6) driving said first vehicle axle through a differential gear means, said sun gear (7) driving said second axle through a gearing drive means, and clutch means to drivingly connect the differential gear means to said gearing drive means.

2. A drive arrangement according to claim 1, wherein the drive arrangement is for an all-wheel drive for motor vehicles with an engine installed essentially transversely to the vehicle longitudinal axis.

3. A drive arrangement according to claim 1, wherein the planet gears (5) are arranged between the ring gear (6) rigidly connected with a cage of the differential gear means which is connected to one vehicle axle and the sun gear is rotatably supported on the cage of the differential gear means and in driving engagement therewith through a portion of said gearing drive means by way of mutually facing teeth of the gears connecting by said clutch.

4. A drive arrangement according to claim 3, wherein the planetary gear carrier is rotatably retained on the sun gear between internal teeth on the sun gear and an extension of the sun gear and said planetary gear carrier being supported at said extension in an axial direction.

5. A drive arrangement according to claim 4, wherein gearing drive means driven by the sun gear includes teeth means for engagement with the teeth of the differential gear means, both said teeth means and said teeth being at substantially the same height and being drivingly connected by said clutch means.

6. A drive arrangement according to claim 5, wherein the gearing drive means of the sun gear includes a spur bevel gearing which is connected with a pinion of a drive shaft for one of the first and second axle means.

7. A drive arrangement according to claim 6, wherein said power transfer differential mechanism includes a housing wall and wherein teeth means of said differential gear are arranged between the housing wall and the pinion, and the pinion is located adjacent the differential gear means with a predetermined distance existing between a longitudinal axis of the pinion and a center axis of the differential gear means.

8. A drive arrangement according to claim 6, wherein said power transfer differential mechanism includes a housing wall and wherein the teeth of the differential gear means are arranged between the pinion and the housing wall with the pinion located adjacent the housing wall, whereby a relatively large distance exists between a longitudinal axis of the pinion and a center axis of the differential gear.

9. A drive arrangement according to claim 1, wherein the planetary gear carrier is rotatably retained on the sun gear between internal teeth on the sun gear and an extension of the sun gear and said planetary gear carrier being supported on said extension in an axial direction.

10. A drive arrangement according to claim 1, wherein the gearing drive means driven by the sun gear includes teeth means for engagement with the teeth of the differential gear means, both said teeth means and said teeth being at substantially the same height and being drivingly connected by said clutch means.

11. A drive arrangement according to claim 1, wherein the gearing drive means driven by the sun gear includes spur bevel gearing which is connected with a pinion of a driven shaft for one of the first and second axle means.

12. A drive arrangement according to claim 11, wherein said power transfer differential mechanism includes a housing wall and wherein teeth of said differential gear means are arranged between the housing wall and the pinion, and the pinion is located adjacent the differential gear means with a predetermined distance existing between a longitudinal axis of the pinion and a center axis of the differential gear means.

13. A drive arrangement according to claim 11, wherein said power transfer differential mechanism includes a housing wall and wherein the teeth of the differential gear means are arranged between the pinion and the housing wall with the pinion located adjacent the housing wall, whereby a relatively large distance exists between a longitudinal axis of the pinion and a center axis of the differential gear.

14. A drive arrangement according to claim 1, wherein teeth on the planet gear (21) are in meshing engagement with teeth on the sun gear (20) and wherein the planet gear is rotatably supported on a differential cage of the differential gear means and the teeth of the sun gear are also connected with a spur gear of the transmission drive means.

15. A drive arrangement according to claim 14, wherein the planetary gear carrier is part of the differential cage of the differential gear means, and wherein said differential cage functions as a carrier for said planet gears.

16. A drive arrangement according to claim 15, wherein the differential cage has a flank including a spur gear, a drawn-in rim neck-shaped extension of the ring gear carries at the end thereof teeth means for the connection with the transmission means by the clutch means.

17. A drive arrangement according to claim 16, wherein the spur gear is connected to a pinion gear in the gearing drive means and is disposed so that a longitudinal axis of the pinion gear extends substantially parallel to a longitudinal axis of the differential gear means.

18. A drive arrangement according to claim 1, wherein the planetary gear carrier means is part of a differential cage of the differential gear means.

19. A drive arrangement according to claim 1, wherein the ring gear is supported at a differential cage of the differential gear means and has thereon a flank including a spur gear, a drawn-in rim neck-shaped extension of the ring gear carries at the end thereof teeth means for the connection with the gearing drive by the clutch means.

20. A drive arrangement according to claim 19, wherein the spur gear is connected to a pinion gear in the gearing drive and is disposed so that a longitudinal axis of the pinion gear extends substantially parallel to a longitudinal axis of the differential gear means.

21. A spur gear-planetary gearing means arrangement for use as a power transfer differential mechanism for an engine-driven four-wheel drive vehicle having first and second axles and a transmission means for transferring power from the engine to said axles, an output shaft of said engine being disposed transversely to the longitudinal axis of the vehicle and substantially parallel to an output shaft means of the transmission means, said arrangement comprising:

a planet gear (5) supported on a planetary gear carrier (4), a ring gear (6) and a sun gear (7), the planet gear being drivingly connected with said ring gear and said sun gear for a power-divided axle drive, said ring gear driving said first axle through a first gearing drive and said sun gear driving said second axle through a second gearing drive, said differential means located in said first gearing drive with an arrangement means operable by a clutch to connect the differential means to the second gearing drive.

* * * * *